United States Patent [19]

Cloutier

[11] Patent Number: 4,823,452

[45] Date of Patent: Apr. 25, 1989

[54] SEAM FORMING APPARATUS FOR ASSEMBLING FLEXIBLE EXPANSION JOINT SYSTEMS

[76] Inventor: Marie-Louis Cloutier, 2821 W. 38th Pl., Hobart, Ind. 46342

[21] Appl. No.: 576,713

[22] Filed: Feb. 3, 1984

[51] Int. Cl.[4] .............................................. B23P 19/02

[52] U.S. Cl. ...................................................... 29/235

[58] Field of Search .................... 29/235; 30/276, 347; 7/103; 172/15

[56] References Cited

U.S. PATENT DOCUMENTS

| | | | |
|---|---|---|---|
| 2,673,396 | 3/1954 | Beres | 172/15 X |
| 2,902,097 | 9/1959 | Cairns | 172/15 |
| 3,048,921 | 8/1962 | Johnson | 172/15 X |
| 3,086,596 | 4/1963 | Allegretti et al. | 172/15 |
| 3,307,249 | 3/1967 | Hohoff | 29/235 |
| 3,364,828 | 1/1968 | Shope et al. | 29/235 |
| 3,541,660 | 11/1970 | Soto | 29/235 |
| 4,169,305 | 10/1979 | Kruszona | 29/235 |

*Primary Examiner*—Robert C. Watson

*Attorney, Agent, or Firm*—Arne R. Jarnholm

[57] ABSTRACT

Seam forming apparatus for assembling flexible expansion joint systems of the type used in bridges and roadways and often referred to as strip seals. The expansion joint systems generally include a pair of rigid rails each of which has an involute channel formed therein and a flexible seal gland which is disposed between the rails. The seal gland includes a compressible head section formed along each of its edges which is adapted for being received in the involute channels to form an interlocking seam therewith. The apparatus of the invention includes a rotatable disc having a plurality of spaced-apart teeth about its circumference, the teeth being adapted for engaging a short portion of a shoulder defined by the compressible head. Pushing means are provided which permit the operator of the apparatus to force a short portion of the compressible head into position in the involute channel, thus forming a short portion of the interlocking seam. Thereafter, rotation of the disc permits the remainder of the interlocking seam to be formed in a sequentially zipper-like manner.

6 Claims, 1 Drawing Sheet

Fig. 1.
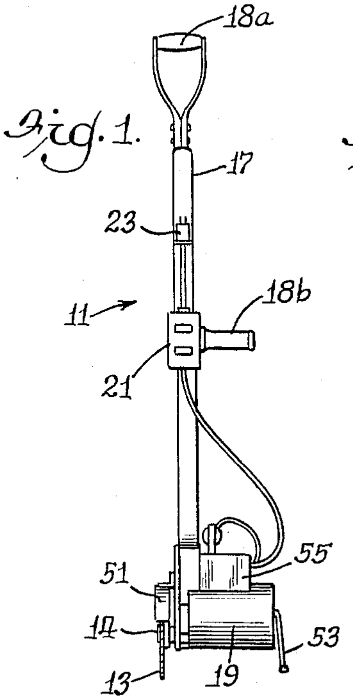
Fig. 2.
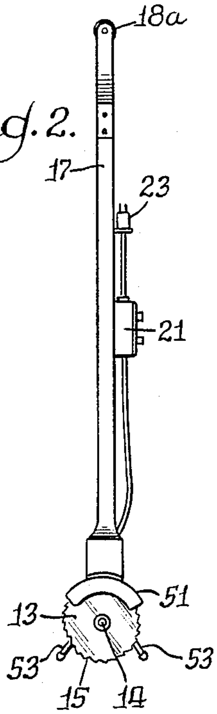
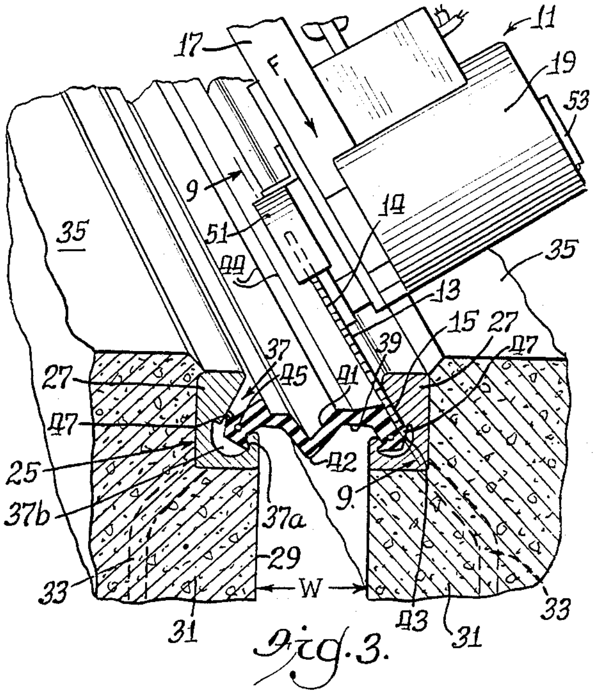
Fig. 3.
Fig. 4.
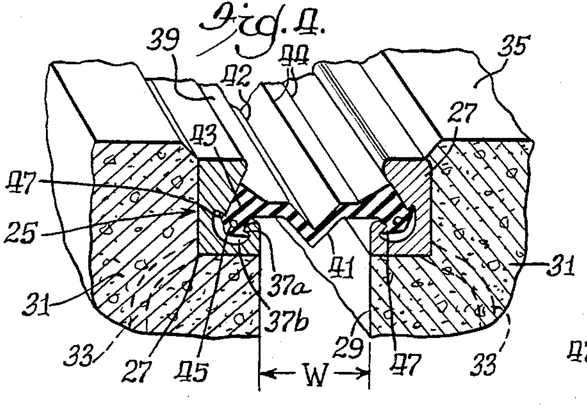
Fig. 5.
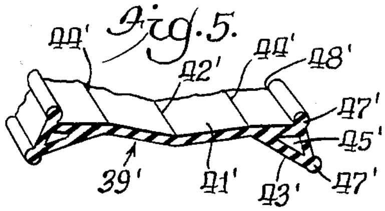
Fig. 6.
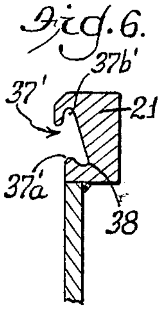
Fig. 7.
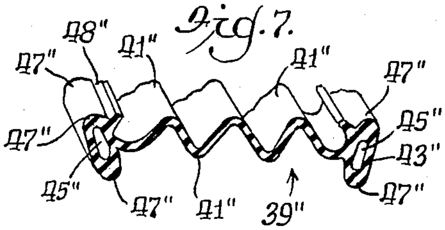
Fig. 8.
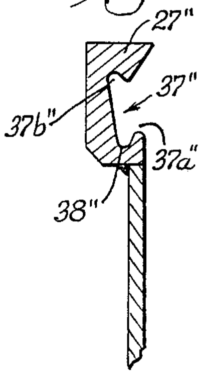
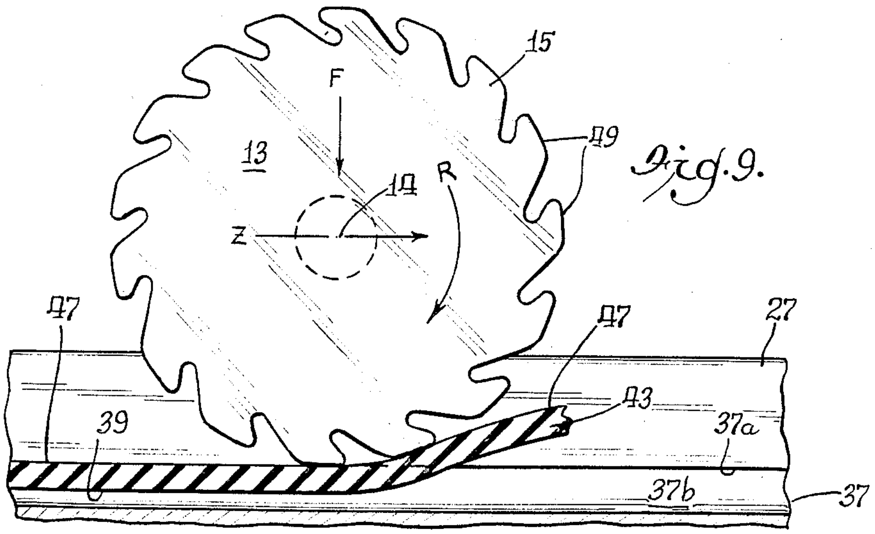
Fig. 9.

SEAM FORMING APPARATUS FOR ASSEMBLING FLEXIBLE EXPANSION JOINT SYSTEMS

BACKGROUND OF THE INVENTION

1. Field of the Invention

The present invention relates generally to the field of bridge construction and maintenance and, more specifically to apparatus for assembling flexible expansion joint systems of the type generally termed "strip seals" in bridges.

2. Description of the Prior Art

Bridges, designed to carry vehicular traffic, often include a plurality of adjacent, prestressed, concrete slabs which present a road or deck surface. The slabs are usually supported by steel beams resting on concrete pillars or abutments.

Because bridges are subjected to a wide range of temperatures, the concrete slabs are separated by a narrow gap or expansion joint which permits them to expand and contract freely. Often the expansion joint is fitted with a tough and resilient seal so that a continuous, water tight road surface is formed. This helps to prevent the corrosive effects of precipitation and road salt from reaching the underlying support structure.

The size of the expansion joint left between the concrete slabs during bridge construction varies with the length of the slab and the ambient temperature at the time the slab is poured. The object, of course, is to provide at least some clearance between the slabs when the ambient temperature is high and to minimize the clearance and the resulting discontinuity in the road surface when the ambient temperature is low.

It will be recognized by those skilled in the art of bridges construction, that the term "expansion joint" is often used to designate the above-mentioned gap between concrete slabs as well as the resilient sealing material fitted into the gap. As used herein, the term "expansion joint" shall refer only to the aforementioned gap and the term "expansion joint system" shall be used to refer to the resilient sealing material and associated anchoring apparatus.

Currently, expansion joint system of the type generally referred to as "strip seals" are being widely used in bridge construction in the U.S. and Canada. These types of expansion joint systems generally include a pair of rigid rails having a flexible strip seal, called a seal gland, disposed therebetween. Usually, the rails are fabricated from extruded or roll-formed steel and the seal gland from a tough, resilient material such as neoprene. The rails are laid generally transverse to the longitudinal direction of the bridge, one rail of each pair being anchored to each edge of adjacent concrete slabs. The seal gland is affixed to each rail by means of an interlocking seam, the formation of which is made possible by the geometry of the seal gland and rails, as explained below.

The seal gland has a substantially uniform transverse cross sectional configuration and comprises a strip-like flexible seal web with a compressible head section formed along each of the web's longitudinal edges. The compressible head sections generally have dimensions larger than the thickness of the web material so that each head section presents a pair of shoulders that run the length of the seal gland. The transverse cross section of the web defines one or more accordian-like pleats which run parallel to the longitudinal axis of the web so that the web is capable of being folded on itself. Usually, the web includes only a few pleats so that when in place, the configuration is a V-shaped or W-shaped trough.

Each rail also has a substantially uniform transverse cross sectional configuration which delineates an involute channel that runs the length of the rail. The involute channel includes a relatively narrow throat section and a relatively bulbous interior and is adapted for receiving one of the compressible head sections of the seal gland. Thus, the transverse cross sectional configuration of each rail in the pair is substantially a mirror image of its counterpart.

After the rails have been anchored in place along the edges of adjacent concrete slabs, the seal gland is laid between the rails with the compressible head sections adjacent the involute channels of the rails. Generally, the lowermost shoulder on each compressible head is inserted through the restricted throat of the involute channel so that the seal gland rests on the rails. The uppermost shoulder is then forced to squeeze through the throat and into the bulbous interior of the adjacent involute channel. To accomplish this the compressible head collapses and then expands to its unstressed shape completely filling the throat. The shoulders presented by the compressible heads are of a dimension slightly larger than the throat so that an interlocking seam is formed between the rail and seal gland. The flexible seal web is folded on its pleats to form the aforementioned V-shaped or W-shaped trough which assumes an angle that is dependent on the distance separating the rails.

Heretofore one of the most difficult steps in assembling a flexible strip seal expansion joint system has been the last, that is forcing the uppermost shoulder of the compressible head through the throat of the involute channel in the rail. This has generally been accomplished in a sequential manner on short sections of the seal gland. A pry bar is engaged with the uppermost shoulder and the tool along with the head are forced through the throat. Often times removal of the pry bar also results in removal of the shoulder or the entire compressible head from the involute channel.

Attempts have been made to reduce the frictional forces exerted on the compressible head by lubrication of the head or the involute channel prior to installation. Often times a liquid epoxy adhesive is employed which serves to initially lubricate the head and later to further anchor the installed seal gland.

Even with lubricants, installations of the seal gland using the above-described prior art method is very labor intensive. It is estimated that a four man crew can install only about 140 linear feet of a seal gland per day. This is the equivalent of 35 linear feet per man-day.

The present invention overcomes the drawbacks of the prior art method and tools for installing seal glands in flexible expansion joint systems. The seam forming apparatus of the present invention permits the installation of approximately 340 feet of seal gland per 8 hour day by a two man crew. This is the equivalent of 170 linear feet per man day.

SUMMARY OF THE INVENTION

In accordance with the present invention, seam forming apparatus is provided for assembling flexible expansion joint systems of the type comprising: at least one rail having an involute channel formed therein which includes a relatively narrow throat and bulbous interior;

a flexible seal gland with a compressible head adapted for being received in said involute channel; and the compressible head of each seal gland including a pair of shoulders adapted for being received in the aforementioned bulbous interior. In particular, apparatus is provided for forming an interlocking seam between the seal gland and rail, said apparatus being adapted for forcing the compressible head of the seal gland into the of the involute channel.

The apparatus of the invention includes a substantially flat and generally circular disc having a plurality of spaced-apart teeth about its circumference. Each of the teeth presents an abutting surface which is adapted for engaging a portion of one of the shoulders on the compressible head. The disc is rotatable about its center on an axis substantially normal to the plane of the disc. Pushing means are provided for forcing the abutting surface of the teeth against the shoulder of the compressible head in a direction normal to the axis of rotation of the disc.

The formation of the interlocking seam between the seal gland and the involute channel in the rail is "started" on a short section of the seal gland as follows: the compressible head portion of the seal gland is laid adjacent the involute channel formed in one of the rails in such a manner that one of the shoulders is placed into the bulbous interior of the involute channel; the rotatable disc of the apparatus of the invention is placed so that the abutting surface of at least one of the spaced-apart teeth engages a short portion of the shoulder remaining on the exterior of the channel; and, the engaged portion of the shoulder is then forced through the throat of the involute channel by exerting a force on the aforementioned pushing means.

After a short section of the interlocking seam has been "started", the rest of the exterior shoulder is easily fed into the remainder of the involute channel in a sequential, zipper-like manner by rotating the disc and moving it along the channel. As the disc is rotated a new tooth begins to engage a sequential section of the shoulder of the compressible head and to push it into the involute channel. At the same time, the initial tooth which "started" the compressible head exits the involute channel, leaving that portion behind. Preferably, the disc is rotated at an angular velocity that will prevent the abutting surface of the teeth from slipping with respect to the shoulder of the compressible head as the disc is moved or rolled along the channel.

In the preferred embodiment of the invention, means are provided for rotating the disc at a predetermined speed which will allow the operator of the apparatus to walk comfortably along the rail as the interlocking seam is formed.

Also in the preferred embodiment of the invention, the shape of the spaced-apart teeth is fin-like and "swept back" with respect to the direction of rotation. This allows for a large abutting surface to engage the shoulder of the compressible head and also provides a tapered configuration so that frictional forces between the tooth and compressible head are rapidly reduced as the tooth exits the involute channel.

It is therefore an object of the present invention to provide new apparatus for inserting the compressible head section of a flexible seal gland in the involute channel of a rail in a flexible strip seal expansion joint system to form an interlocking seam therebetween.

It is another object of the invention to provide new apparatus that can perform the aforementioned seam formation at a rate substantially greater than the rate of prior art methods and tools.

A feature of the present invention is that it can be readily adapted for supplying lubricant or adhesive to the flexible seal gland during seam formation.

Another feature of the invention is that seam formation in flexible strip seal expansion joints can be performed with greatly reduced effort by the installer.

These and other objects and features of the present invention will become evident to those skilled in the art from the following detailed description of the invention, claims and accompanying drawings of which:

FIG. 1 is front elevational view of a preferred embodiment of the invention;

FIG. 2 is a side elevational view of the apparatus of the invention illustrated in FIG. 1;

FIG. 3 is a rear perspective view of the apparatus shown in FIGS. 1 and 2, in operation, forming an interlocking seam between a seal gland and one rail in a type SS flexible strip seal expansion joint system marketed by its manufacturer the D.S. Brown Co. of North Baltimore, Ohio, under the registered trademarks Delastiflex and Steelflex, the expansion joint system also being shown in transverse cross-section;

FIG. 4 is a perspective and transverse cross-sectional view of the type SS flexible strip seal expansion joint shown in FIG. 3, fully assembled and installed between a pair of concrete slabs of the type used in bridge construction;

FIG. 5 is a perspective and transverse cross-sectional view of the seal gland used in a type SS flexible strip seal expansion joint system designated as Wabo S-400E;

FIG. 6 is a cross-sectional view of the rail and anchor system employed with the seal gland shown in FIG. 5;

FIG. 7 is a perspective and transverse cross-sectional view of a neoprene seal gland in a type SS flexible strip seal expansion joint system designated by its manufacturer as General Tire GS-400; and FIG. 8 is a cross-sectional view of the rail and anchor system employed with the seal gland shown in FIG. 7.

FIG. 9 is an enlarged, cross-sectional view of FIG. 3, taken along line 9—9 and looking in the direction of the arrows with portions of the apparatus of the invention along omitted for purposes of clarity.

DETAILED DESCRIPTION OF THE INVENTION

Referring now to the drawings, and in particular FIGS. 1 and 2, there is illustrated the preferred embodiment ofthe seam forming apparatus of the invention, designated generally by reference numeral 11. As can be seen, the seam forming apparatus 11 comprises a substantially flat and generally circular disc 13, rotatable about center 14 and having a plurality of spaced-apart teeth 15 about its circumference. Pushing means in the form of a handle 17 is provided to permit the application and transfer of a force to the spaced-apart teeth 15 in a direction substantially normal to the axis of rotation of the disc 13. Spaced-apart hand grips **18*a* and 18*b* ease the handling of the apparatus 11 by an operator. Means for rotating the disc 13, is provided in the form of an electric motor 19 to ease the force required to be exerted on the handle 17 by the operator during the seam formation. The electric motor 19 is provided with on-off switching means 21 and a power supply cord 23**.

Referring now to FIGS. 2 and 3 there is illustrated a flexible strip seal expansion joint system 25 of the type often employed in bridge construction and the assembly of which is facilitated by the seam forming apparatus of the invention 11. The apparatus of the invention 11 was successfully tested on this type of expansion joint system which includes a pair of steel rails 27 anchored to the edges 29 of a pair of adjacent concrete slabs 31 and joined by a seal gland 39 disposed therebetween. Steel studs 33 are affixed to the rails 27 and embedded directly in the concrete slabs 31. The slabs 31 present a road surface 35 and are separated by an expansion joint having a dimension, W, which permits them to expand and contract freely with the ambient temperature.

Each rail has a substantially uniform transverse cross-sectional configuration which delineates an involute channel 37 that is formed over the length of the rail. The involute channel includes a relatively narrow throat 37*a* and a relatively bulbous interior 37*b* which are adapted for forming an interlocking seam with the seal gland 39.

The seal gland 39 also has a substantially uniform transverse cross-sectional configuration and includes a strip-like flexible seal web 41 with a compressible head section 43 formed along each of the web's longitudinal edges.

FIGS. 3 and 4 show that the configuration of the seal web 41 is generally that of a V-shaped trough. The web 41 has center pleat 42. As the ambient temperature changes, the dimension W of the expansion joint changes and the angle assumed by the web about the center pleat 42 varies accordingly. Because the compressible heads 43 are received in the involute channels 37 at a slightly downward angle with respect to the horizontal, creases 44 are provided to lessen the stress thus generated.

The compressible head sections 43 are generally continuous with the seal web 41 and include a pair of shoulders 47 which, in the unstressed state, have a dimension between them greater than the opening of the throat 37*a* in the involute channel 37.

The compressible heads 43 are adapted for being compressed and received in the involute channel 37. For this reason, they are often formed with a hollow center 45 which renders the head 43 more pliable and lessens the force required to squeeze it into the throat 37*a*. Once the shoulders 47 have passed the throat 37*a*, they assume their unstressed configuration and expand in the bulbous interior 37*b* of the channel 37. The compressible head also expands to completely fill the throat. Thus, the shoulders 47 and the compressible head 43 lock the seal gland 39 into the involute channel 37.

The seam forming apparatus of the invention 11 facilitates the forcing of the compressible heads 43 into the throat 37*a* so that the shoulders 47 enter the bulbous interior 37*b* of the involute channel 37. FIG. 3 illustrates the positioning of the apparatus of the invention 11 and the seal gland 39 during seam formation. With the rails 27 already anchored to the concrete slabs 31, the seal gland 41 is positioned so that the compressible heads 43 lie adjacent the involute channels 37. As shown in the left hand portion of FIG. 3, the lowermost shoulder 47 is inserted in the bulbous interior 37*b*, past the throat 37*a* of the involute channel 37. The seam forming apparatus of the invention 11 is then positioned so that the spaced-apart teeth 15 engage the uppermost shoulder 47 which remains exterior of the throat 37*a*. Thereafter, a downward force exerted on the handle 17 in the direction of arrow F shown in FIG. 3, causes a short longitudinal section of the compressible head 45 to collapse and the uppermost shoulder 47 to pass through the throat 37*a* and enter the bulbous interior 37*b* of the involute channel 37.

Referring now to FIG. 9, there is shown a detailed view of the rotatable disc 13 and spaced-apart teeth 15. Each of the spaced-apart teeth 15 presents an abutting surface 49 which engages the shoulder 47 transferring the downward force F to the shoulder 47. Thereafter the rotatable disc 13 is rotated in the direction of arrow R while force F is maintained. This causes successive spaced-apart teeth 15 to engage a successive portion of the shoulder 47 while the teeth 15 which initially forced the shoulder into the bulbous interior 37*b* are withdrawn from the involute channel. Thus, the rotatable disc 13 is moved along the channel 37 in the direction of arrow Z and the interlocking seam between the seal gland 39 and rail 27 is formed in a zipper-like manner.

FIG. 9 also illustrates the preferred shape of the spaced-apart teeth as being fin-like and swept back with respect to the direction of rotation R. This configuration provides each tooth 15 with a large abutting surface 49 so that the teeth can push the shoulder 47 into the bulbous interior 37*b* of the involute channel 37. Conversely, as the teeth 15 exit the involute channel 37 they present a tapered shape so that the area of contact between the teeth 15 and the head 43 is rapidly reduced. It is believed that this reduces the frictional forces between the teeth 15 and compressible head 43 so that the head is not withdrawn with the tool, as often occurs in the prior art method of seam formation employing a pry bar.

In the illustrated embodiment of the invention 11, the rotatable disc 13 was prepared from a seven and one quarter inch diameter circular saw blade manufactured by Black and Decker of Hamstead, MD. The manufacturer's intended use for the saw blade is designated as a ripping and cross cutting. The edges of the teeth on the saw blade were dulled by abrasion so that the abutting surfaces 49 would not cut into the shoulders 47 of the compressible head 43.

The electric motor 19 used for rotating the disc is supplied by Dayton Electric Mfg. of Chicago, IL 60648 and includes a gear reduction apparatus so that the disc 13 can be rotated at a low speed. For experimental purposes an angular velocity of 6 r.p.m. (No. 3M126A) was chosen which allows the operator of the seam forming apparatus of the invention to easily guide the disc 13 down the involute channel. Higher angular velocity can easily be applied to the disc 13 so long as the operator can comfortably control the apparatus 11.

The illustrated embodiment of the invention 11 also includes a disc guard 51 which shields the teeth 15 that would normally be exposed during seam formation. The guard 51 reduces the likelihood that the operator's clothing or an electrical extension cord plugged into the power supply cord 23 will become entangled in the teeth 15. A pair of legs 53 are hingedly fixed to the rear of the electric motor 19 and can be folded down so that the apparatus 11 can stand with the handle 17 upright. A power outlet 5 electrically connected to the power supply cord 23 permits two apparatus 11 to work in tandem, one ahead of the other and separated by a short intermediate electrical cord.

As previously mentioned, liquid epoxy adhesive is often used to lubricate the compressible heads 43 of the seal gland as well as to further anchor the heads in the involute channel. The seam forming apparatus of the invention can readily be adapted for applying such adhesive directly to the compressible head during seam formation. Although not shown in the drawings, adhesive can easily be pumped from a reservoir through tubing or conduit affixed to the apparatus. Thus, the flow of adhesive can be metered in accordance with the angular velocity of the disc and directed at the compressible head before it is forced into and received in the involute channel.

FIGS. 5 and 6 illustrate a seal gland 39' and rail 27' employed in a flexible strip seal expansion joint system known as Wabo S-400E. The seal gland 39' includes a seal web 41' and a pair of compressible head sections 43' having hollow centers 45' and a pair of shoulders 47'. The seal web 41' has a center pleat 42' disposed between a pair of creases 44'. The rail 27' has an involute channel 37' formed therein which includes a restricted throat 37*a'* and a relatively bulbous interior 37*b'*. The involute channel 37' is adapted for receiving one of the compressible heads 43' and forming an interlocking seams therewith.

The apparatus of the invention 11 can be used on the Wabo S-400E in a manner similar to that previously described for the Delastiflex. The lower shoulder 47' is placed into the lower portion of the bulbous interior of the involute channel designated 38'. The uppermost shoulder 47' is then engaged by the rotatable disc 13 at the location designated 48'. A downward force F can be applied to the handle of the apparatus of the invention 11 to cause the compressible head 43' to collapse, so that the shoulder 47' passes through the throat 37*a'* and into the bulbous interior 37*b'* of the involute channel 37'. Thereafter the compressible head 43' will resume its unstressed configuration thus forming the interlocking seam.

FIGS. 7 and 8 illustrate a seal gland 39" and rail 27" employed in a flexible strip seal expansion joint system by General Tire designated as GS-400. The seal gland 39" differs from those previously described in that the web 41" includes five pleats 42", rendering its cross-sectional configuration that of a W. The compressible heads 43", while of slightly different configuration, are still formed with hollow centers 45" and include a pair of shoulders 47". The rail 27" also has an involute channel 37" which includes a relatively narrow throat 37*a"* and bulbous interior 37*b"* formed therein.

As with the previously described expansion joint systems the compressible head 43" is adapted for being received in the involute channel 37" in the rail 27" and forming an interlocking seam therewith. The seam forming apparatus of the invention 11 facilitates the seam formation in a manner similar to that previously described in conjunction with the Wabo S-400E. The lowermost shoulder 47" is placed into the lower portion of the bulbous interior 37*b"* of the involute channel at the location designated 38". The disc 13 of the apparatus is used to engage the uppermost shoulder 47" at the location designated 48". Thereafter, a downward bearing force F applied to the handle 17 of the apparatus 11 will cause the compressible head 43" to collapse, pass through the throat 37*a"* and into the bulbous interior 37*b"* of the involute channel 37" thus forming the interlocking seam.

It will be obvious to those skilled in the art, that, in connection with the preceding discussion of FIGS. 5-8 inclusive, rotation of the disc 13 of the apparatus of the invention 11 will result in the formation of an interlocking seam in a zipper-like manner as the apparatus is moved along each of the involute channels. Further, it will be obvious that in the flexible strip seal expansion joint systems described in connection with the aforementioned figures, a pair of rails having transverse cross-sectional configurations that are substantially mirror images of one another must be employed. It will also be obvious that the right hand compressible head 43' in FIG. 5 is adapted for forming an interlocking seam with the rail 27' shown in FIG. 6 and that the left hand compressible head 43" shown in FIG. 7 is adapted for forming an interlocking seam with rail 27" shown in FIG. 8.

Finally, FIGS. 6 and 8 show plates designated as 59' anmd 59" affixed to rails 27' and 27" respectively. The plates 27' and 27" illustrate another method by which the rails are anchored to the concrete slab 31. Studs or anchors, similar to those shown in FIG. 3, are affixed to the plates and embedded directly in the slabs. The plates also offer protection to the edges 29 of the adjacent concrete slabs 31.

It should be understood that although certain preferred embodiments of the present invention have been illustrated and described, various modifications, alternatives and equivalents thereof will become apparent to those skilled in the art and, accordingly, the scope of the present invention should be defined only by the appended claims and equivalents thereof.

What is claimed is:

1. Seam forming apparatus for forming an interlocking seam in a flexible strip seal expansion joint system of the type including at least one rail having a substantially uniform transverse cross-sectional configuration which defines an involute channel having a relatively narrow throat and relatively bulbous interior, and a seal gland also having a substantially uniform transverse cross-sectional configuration which defines a compressible head section that presents a pair of shoulders and which is affixed to a web; said involute channel in said rail being adapted for receiving said compressible head section of said seal gland to form an interlocking seam therewith; said apparatus comprising:

- a substantially flat and circular disc, rotatable about its center;
- a plurality of spaced-apart teeth about the circumference of said disc;
- an abutting surface on each of said teeth engagable with one of said shoulders of said compressible head;
- said spaced-apart teeth having a fin-like configuration, swept back with respect to the direction of rotation of said disc; and
- pushing means adapted for applying a force to said rotatable disc in a direction substantially normal to the axis of rotation of said disc;
- so that when said compressible head is located adjacent said involute channel such that one of said shoulders is placed in the bulbous interior of said involute channel and the abutting surface of at least one of said teeth is engaged with said other shoulder of said compressible head section, a force can be applied to said pushing means and transferred to said teeth causing a longitudinal portion of the compressible head section to collapse, so that said other shoulder can be squeezed through the throat and received in the bulbous interior of the involute channel and permitted to expand to its unstressed configuration, thus starting said seam formation and,
- so that the remainder of the compressible head section of the seal gland can be fed into the involute channel in a sequential, zipper-like, manner by maintaining said force on said pushing means, rotating the disc and moving it along the channel causing new teeth to sequentially engage successive sections of said other shoulder of said compressible head and pushing successive sections through the throat and into the bulbous interior of said involute channel, thus completing the formation of the interlocking seam between said seal gland and rail.

2. Apparatus in accordance with claim 1 wherein said rotatable disc and said spaced-apart teeth are provided in the form of a circular saw blade.

3. Apparatus in accordance with claim 1 further comprising means for rotating said disc.

4. Apparatus in accordance with claim 3 wherein said means for rotating said disc is an electric motor.

5. Apparatus in accordance with claim 1 wherein said pushing means is a handle having a pair of spaced-apart grips.

6. Apparatus in accordance with claim 1 further comprising a guard over a portion of said rotatable disc and spaced-apart teeth.

* * * * *